United States Patent

Arai

Patent Number: 4,459,391
Date of Patent: Jul. 10, 1984

[54] METHOD OF MAKING AND A POLYMER OF HEAT RESISTANT POLYESTER USING DIGLYCIDIL SUBSTITUTED DIIMIDES

[75] Inventor: Yoshihiro Arai, Joyo, Japan

[73] Assignee: Unitika Limited, Osaka, Japan

[21] Appl. No.: 540,256

[22] Filed: Oct. 11, 1983

[30] Foreign Application Priority Data

Jan. 7, 1983 [JP]  Japan .................................. 58-1369

[51] Int. Cl.³ .............................................. C08G 63/76
[52] U.S. Cl. .................................... 525/438; 525/444; 528/288; 528/289; 528/292; 528/296; 528/297
[58] Field of Search ............... 528/288, 289, 292, 296, 528/297; 525/438, 444

[56] References Cited

U.S. PATENT DOCUMENTS

4,069,209  1/1978  Lange ............................... 528/296 X
4,348,500  9/1982  Robeson et al. ................. 525/438 X
4,365,046  12/1982  Pesata et al. ..................... 528/296 X

*Primary Examiner*—Lucille M. Phynes
*Attorney, Agent, or Firm*—Richard A. Anderson

[57] ABSTRACT

This invention is a method of making and polymer of heat resistant polyester, being characterized by the reaction product of a polyester which consists of the aromatic dicarboxylic acid and a glycol with 2-6 carbons reacted with 0.2-5 weight % of a bifunctional epoxy compound which is expressed by the general formula

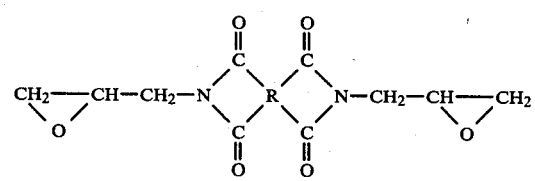

wherein R is benzene ring, naphthalene ring, cyclohexane ring, cyclohexene ring or pyridine ring; and R may have a substitution group to keep the amount of the end carboxyl groups below 15 gram equivalents per $10^6$ grams of polymer.

7 Claims, No Drawings

METHOD OF MAKING AND A POLYMER OF HEAT RESISTANT POLYESTER USING DIGLYCIDIL SUBSTITUTED DIIMIDES

BACKGROUND OF THE INVENTION

This invention is related to the method of making heat resistant polyester in which the amount of the end carboxyl group is reduced.

It is well known that, in order to improve the thermal stability, i.e., the resistance to hydrolysis and resistance to aminolysis of polyester, the effective means is to reduce the amount of the end carboxyl group (hereinafter this will be referred to as (COOH)). Many methods of reducing the (COOH) of polyester have been proposed. Among them, however, the method of reacting with epoxy compound (Kokai Patent Publication No. 6051-1979 and many others) is known as the typical example. This prior method indeed reduces (COOH) but it also reduces the degree of polymerization.

SUMMARY OF THE INVENTION

Studies were carried out to solve this problem and it was discovered that an effective method is to react the bifunctional epoxy compound which is expressed by the general formula

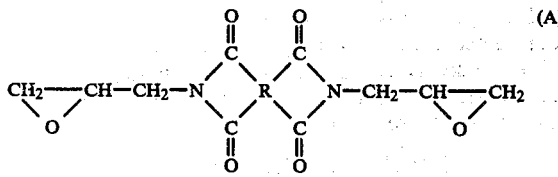

wherein R is benzene ring, naphthalene ring, cyclohexane ring, cyclohexene ring or pyridine ring; R may have a substitution group.

This invention is the method of making heat resistant polyester which is characterized by starting with the polyester which consists of aromatic dicarboxylic acid and glycol of 2-6 carbons and reacting with 0.2-5 weight % of the bifunctional epoxy compound which is expressed by the general formula (A) given above to keep (COOH) below 15 g equivalents per $10^6$ g of the polymer.

In this invention, polyester means the poly-condensation product from the aromatic dicarboxylic acid and glycol with 2-6 carbons; its types are not restricted. Also, it can be either a homopolymer or a copolymer. As for the method of polyester poly-condensation one can use the known methods without modification.

As the specific examples of the bifunctional epoxy compounds which is expressed by the above given general formula (A), one can raise the following:

N,N'-digylcidilpyromellitic acid imide;
3-methyl-N,N'-diglycidilpyromellitic acid diimide;
3-chloro-N,N'-diglycidylpyromellitic acid diimide;
N,N'-diglycidilnaphthalenetetracarboxylic acid [2,3,6,7]diimide;
1-methyl-N,N'-diglycidilnaphthalenetetracarboxylic acid [2,3,6,7]diimide;
N,N'-diglycidilcyclohexanetetracarboxylic acid [1,2,4,5]diimide;
N,N'-diglycidilcyclohexenetetracarboxylic acid [1,2,4,5]diimide;
N,N'-diglycidilcyclohexenetetracarboxylic acid [1,3,4,6]diimide;
N,N'-diglycidilpyridinetetracarboxylic acid [2,3,5,6]diimide.

Such bifunctional epoxy compound can be used alone or in combination of two or more.

The amount of addition of the compound expressed by the above general formula (A) which is used in this invention is 0.2-5 weight % with respect to the polyester. If this amount is too small, the degree of blocking of (COOH) is low; conversely, if it is too much the reaction occurs sufficiently but problems such as the gelation of polyester arise.

The reaction of polyester and the compound of above shown general formula (A) takes place when the above compound of the general formula (A) is added after the polyester reached an intrinsic viscosity of 0.50 and the reaction takes more than 3 minutes at the temperature above the melting temperature of the polyester. Here the intrinsic viscosity refers to the one which is measured at 20° C. by using the mixed solvent of phenol-tetrachloroethane (1/1 weight ratio). At the time of reaction, it is naturally necessary that the atmosphere is filled with an inert gas such as nitrogen or the active gas such as oxygen which accelerates the decomposition of polyester is blocked by other methods; also, the reaction should be carried out under stirring. The compound of the general formula (A) can be added and mixed before the completion of the polycondensation of polyester; however, one can also use the method in which the compound is added to the polyester in the molten state after the completion of polymerization and mixed for melt spinning or the method in which the compound is mixed with the pulverized solid polyester and then the melt spinning is carried out and the reaction is let to occur. The reaction proceeds without a catalyst but one can also use a desirable catalyst.

With the addition of the compound which is expressed by the above shown general formula (A), (COOH) of polyester decreases effectively; also, as the compound of the above shown general formula (A) is bifunctional, there is little reduction in the degree of polymerization of the polymer due to the addition of this compound; rather, the polyester chains are linked to each other, bringing a favorable result of increased degree of polymerization.

In this way, improvement of heat resistance is achieved by reacting polyester with the compound of general formula (A) with 0.2-5 weight % and keeping the (COOH) below 15 g equivalents per $10^6$ g of the polymer.

In obtaining the polyester of this invention, it is, of course, possible to add other additives to the polyester for other purpose.

The final form of polyester in this invention can be fiber, film or any other form.

The polyester of this invention with reduced (COOH) has improved thermal stability, i.e., resistance to hydrolysis or aminolysis at high temperature and its practical value achieves a great increase with the performance improvement in the conventional applications, rationalization of processes, and possible application to the new areas where it could not be applied in the past.

In the following, we explain the invention more specifically by use of examples of application.

EXAMPLE OF THE INVENTION, 1

To the polyethyleneterephthalate chips which were obtained by the common method from terephthalic acid and ethylene glycol and had an intrinsic viscosity of 0.73 and (COOH) of 24 g of equivalent/$10^6$ g polymer, N,N'-diglycidilpyromellitic acid diimide was blended by 0.6 weight %. This was spun by use of a spinnerette die having 192 holes of hole diameter 0.5 mm. The spinning conditions were: temperature, 300° C.; residence time, 5–15 minutes; throughput, 300 g/min.; windup speed, 317 m/min. The yarn obtained had 8520 d/192 f. The undrawn yarn obtained was drawn to a ratio of 3.8 at the first stage at 90° C. and drawn to a ratio of 1.5 at the second stage at 200° C. Next, the yarn was heat treated under tension at 220° C. and finally the drawn yarn of 1500 d/192 f was obtained. Intrinsic viscosity of this drawn yarn was 0.87 and (COOH) was 8 g equivalent/$10^6$ g polymer. With this drawn yarn, first the Z twist of 40T/10 cm was done and then, after joining two strands, the S twist of 40T/10 cm was carried out to obtain the griege cord of 1500 d×2. This griege cord was dipped in a one-bath type adhesive solution. (Pexul (made by ICI Company)—RFL solution); after applying a tension of 1.0 kg/cord, a heat treatment at 240° C. for 3 minutes was carried out to obtain the treated cord. Strength of this treated cord was measured and was found to be 22.0 kg. Next, in order to examine the heat resistance of this treated cord, measurement of the heat resistant strength was measured with a sample which was prepared under the vulcanization conditions of 170° C., 100 kg/cm$^2$, 60 minutes and the heat resistant strength retention was found to be 83%. Next, the adhesive force of the treated cord was evaluated by H-test. First, the test piece was prepared under the vulcanizing adhesion condition of 150° C., 100 kg/cm$^2$, 30 minutes; then the adhesion force was measured and was found to be 19.8 kg.

COMPARATIVE EXAMPLE 1

Except for not adding the epoxy compound, the same procedure of Example 1 was repeated to prepare the drawn yarn and the treated cord. Their properties are shown in Table 1. (COOH) did not decrease; heat resistant strength and heat resistant strength retention decreased; the adhesive force was not good either.

EXAMPLES OF THE INVENTION, 2–4

Except for using the compounds listed in Table 1 as the epoxy compound, the same procedure of Example 1 was repeated to prepare the drawn yarn and the treated cord. Their properties are shown in Table 1. (COOH) decreased, intrinsic viscosity increased, the heat resistant strength and heat resistant strength retention improved and the adhesive force was also good.

COMPARATIVE EXAMPLES, 2, 3

Except for making the amount of addition of the epoxy compound to be 0.1 weight % (Comparative Example 2) and 6 weight % (Comparative Example 3), the same procedure of Example 1 was repeated to prepare drawn yarn and treated cord. Their properties are shown in Table 1. When the amount of addition of the epoxy compound was too small (Comparative Example 2), decrease of (COOH) was small and the degree of improvement on the heat resistant strength and heat resistant strength retention was also small. Reversely, when the amount of addition was too large (Comparative Example 3), gelation of the polymer occurred and spinning was not possible.

COMPARATIVE EXAMPLE 4

Except for adding the monofunctional N-glycidilphthalimide as the epoxy compound, the same procedure of Example 1 was repeated to prepare the drawn yarn and treated cord. Their properties are shown in Table 1. (COOH) decreased but the intrinsic viscosity decreased and the strength and heat resistant strength values were low. Thus, the result was not good.

COMPARATIVE EXAMPLE 5

In place of N,N'-diglycidilpyromellitic acid diimide, Epolite 3002 (Kyoeisha Yushi Kagaku K.K.) with the structural formula of

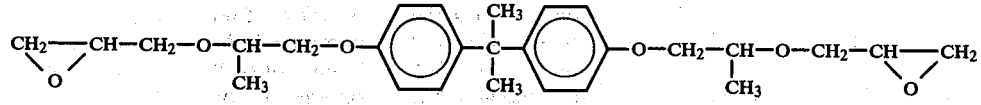

was added as the bifunctional epoxy compound. Other than this, the same procedure of Example 1 was repeated to prepare the drawn yarn and treated cord. Their properties are shown in Table 1. Reactivity with (COOH) was not good and decrease in (COOH) was small. Degree of improvement on the heat resistant strength and heat resistant strength retention was also low.

TABLE 1

| | Epoxy Compounds | | Drawn Yarn | | Treated Cord | | | |
|---|---|---|---|---|---|---|---|---|
| | | | | | | Heat | | |
| Example Number | Name of Compound | Amt. of Addition, Weight % | Intrinsic Viscosity | (COOH) Grams Equivalent/ $10^6$ Grams | Strength, kg | Resistant Strength, kg | Strength Retention, % | Adhesive Force, kg |
| 1 of invention | N,N'diglycidilpyromellitic acid diimide | 0.6 | 0.87 | 8 | 22.0 | 18.3 | 83 | 19.8 |
| 2 | N,N'diglycidilnaphthalene-tetracarboxylic acid (2,3,6,7)-diimide | 0.6 | 0.85 | 10 | 20.8 | 16.9 | 81 | 18.6 |
| 3 | N,N'—diglycidilcyclohexane-tetracarboxylic acid (1,2,4,5)-diimide | 0.6 | 0.85 | 11 | 20.6 | 16.8 | 81 | 18.4 |
| 4 | N,N'—diglycidilpyridinetetra-carboxylic acid (2,3,5,6)diimide | 0.6 | 0.84 | 10 | 21.0 | 17.2 | 82 | 18.8 |
| Compar- | — | — | 0.70 | 25 | 18.4 | 11.0 | 60 | 15.2 |

TABLE 1-continued

| Example Number | Epoxy Compounds | | Drawn Yarn | | Treated Cord | | | |
| --- | --- | --- | --- | --- | --- | --- | --- | --- |
| | Name of Compound | Amt. of Addition, Weight % | Intrinsic Viscosity | (COOH) Grams Equivalent/ $10^6$ Grams | Strength, kg | Heat Resistant Strength, kg | Strength Retention, % | Adhesive Force, kg |
| ative Example 1 | | | | | | | | |
| Comparative Example 2 | N,N'—diglycidilpyromellitic acid diimide | 0.1 | 0.72 | 18 | 18.4 | 13.1 | 60 | 15.8 |
| Comparative Example 3 | N,N'—diglycidilpyromellitic acid diimide | 6.0 | Spinning impossible | | — | — | — | — |
| Comparative Example 4 | N—glycidilphthalimide | 0.6 | 0.68 | 6 | 17.5 | 12.2 | 70 | 15.4 |
| Comparative Example 5 | Epolite 3002 | 0.6 | 0.66 | 25 | 17.0 | 10.6 | 62 | 14.2 |

I claim:

1. A method of making heat resistant polyester from a polyester which consists of reacting an aromatic dicarboxylic acid with a glycol with 2 to 6 carbons and reacting said polyester with 0.2 to 5 weight % of a bifunctional epoxy compound which is expressed by the general formula

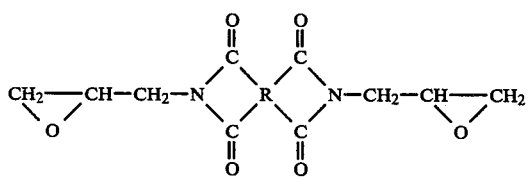

wherein R is a benzene ring, naphthalene ring, cyclohexane ring, cyclohexene ring or pyridine ring, or a substituted benzene, naphthalene, cyclohexane, cyclohexene or pyridine ring; to keep the amount of the end carboxyl groups below 15 g equivalents per $10^6$ g of polymer.

2. The method of claim 1 wherein from about 0.2 to 5 percent by weight of (A) is added.

3. The method of claim 1 wherein (A) is selected from the group consisting of:
N,N'-diglycidilpyromellitic acid imide,
3-methyl-N,N'-diglycidilpyromellitic acid diimide;
3-chloro-N,N'-diglycidilpyromellitic acid diimide;
N,N'-diglycidilnaphthalenetetracarboxylic acid [2,3,6,7]diimide;
1-methyl-N,N'-diglycidilnaphthalenetetracarboxylic acid [2,3,6,7]diimide;
N,N'-diglycidilcyclohexanetetracarboxylic acid [1,2,4,5]diimide;
N,N'-diglycidilcyclohexenetetracarboxylic acid [1,2,4,5]diimide;
N,N'-diglycidilcyclohexenetetracarboxylic acid [1,3,4,6]diimide; and
N,N'-diglycidilpyridinetetracarboxylic acid [2,3,5,6]diimide.

4. The method of claim 2 wherein (A) reacts after said polyester has reached an intrinsic viscosity of 0.5 and the reaction occurs for more than 3 minutes at a temperature above the melting point of said polyester.

5. A heat resistant polyester polymer comprising a polyester which consists of an aromatic dicarboxylic acid reacted with a glycol with 2 to 6 carbons and further reacted with 0.2 to 5 weight % of a bifunctional epoxy compound which is expressed by the general formula

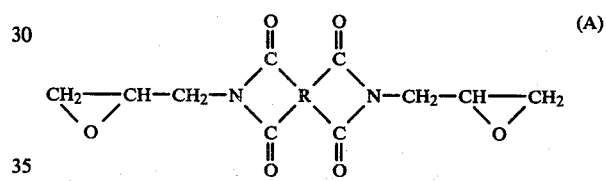

wherein R is a benzene ring, naphthalene ring, cyclohexane ring, cyclohexene ring or pyridine ring, or a substituted benzene, naphthalene cyclohexane, cyclohexene or pyridine ring; to keep the amount of the end carboxyl groups below 15 g equivalents per $10^6$ g of polymer.

6. The polymer of claim 1 wherein from about 0.2 to 5 percent by weight of (A) was reacted.

7. The polymer of claim 1 wherein (A) is selected from the group consisting of
N,N'-diglycidilpyromellitic acid imide,
3-methyl-N,N'-diglycidilpyromellitic acid diimide;
3-chloro-N,N'-diglycidilpyromellitic acid diimide;
N,N'-diglycidilnaphthalenetetracarboxylic acid [2,3,6,7]diimide;
1-methyl-N,N'-diglycidilnaphthalenetetracarboxylic acid [2,3,6,7]diimide;
N,N'-diglycidilcyclohexanetetracarboxylic acid [1,2,4,5]diimide;
N,N'-diglycidilcyclohexenetetracarboxylic acid [1,2,4,5]diimide;
N,N'-diglycidilcyclohexenetetracarboxylic acid [1,3,4,6]diimide; and
N,N'-diglycidilpyridinetetracarboxylic acid [2,3,5,6]diimide.

* * * * *